Feb. 11, 1936.  L. E. GARFIELD ET AL  2,030,442

ROLLER BEARING BIT

Filed Oct. 28, 1933

LEWIS E. GARFIELD
FLOYD L. SCOTT   INVENTORS

BY Jesse R. Stone

ATTORNEY

Patented Feb. 11, 1936

2,030,442

UNITED STATES PATENT OFFICE 2,030,442

ROLLER BEARING BIT

Lewis E. Garfield and Floyd L. Scott, Houston, Tex., assignors to Hughes Tool Company, Houston, Tex., a corporation of Texas Application October 28, 1933, Serial No. 695,554

15 Claims. (Cl. 255—71)

Our invention relates to well drills and has particular application to the bearings for roller cutters on deep well drills.

The invention has for its object to provide antifriction bearings for rolling cutters, which will assure the turning of the cutter on its support, so that it will not "freeze" on its bearing and wear flat on one side and fail to cut.

The invention has application particularly to the Hughes cone bit disclosed in the patent to Scott and Wellensiek No. 1,647,753 issued November 1, 1927, wherein the cutters surround the ends of the shafts upon which they are mounted.

It is a further object, in a cutter of this character, to employ cylindrical bearing rollers to take the bearing thrust transversely of the shaft and a set of ball bearings to take the thrust longitudinally of the shaft.

We also desire to employ the ball bearings to retain the cutter on its shaft and to be enabled to insert such bearings through the shaft into the ball raceway after the cutter is in position thereon.

It is a further object to so mount the roller bearings that there may be longitudinal play between the cutter and shaft without the thrust resulting therefrom being taken upon the rollers. We arrange for the cutter to either move longitudinally relative to the rollers, or for the rollers to slide longitudinally relative to the shaft.

It is a further object to provide a loose fit between the cutter and the shaft so that the well fluid may circulate about the shaft and bearings and assist in the lubrication thereof.

Figure 1:
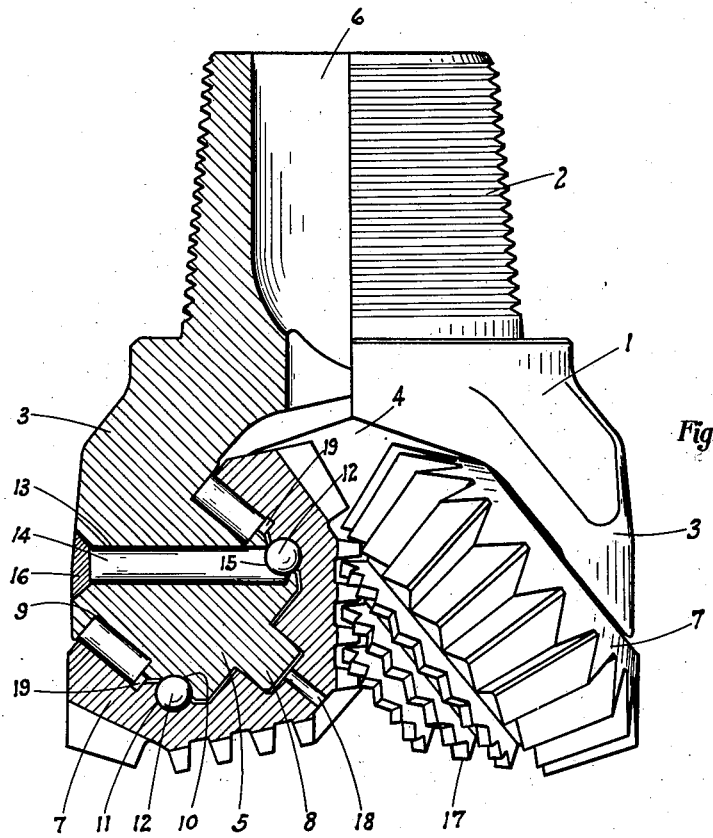
Figure 2:
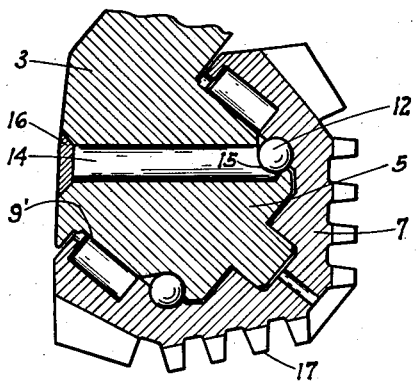

In the drawing herewith Fig. 1 is a side elevation of a well drill illustrating our invention, one half being in central longitudinal section. Fig. 2 is a longitudinal section of a cutter on its shaft and illustrating a slightly different embodiment of the invention.

In Fig. 1 is shown a well drill including a head 1 having an upwardly tapered shank 2 threaded for engagement with a drill collar or tool joint, not shown.

The head has two downwardly diverging legs 3, thus providing a wide cleft or notch 4 between them. On the inner face of each leg is a downwardly and inwardly inclined shaft 5 preferably formed integrally with the leg. The shank and head are formed with a longitudinal passage 6 of large capacity to allow the discharge of flushing fluid downwardly upon cutters 7 mounted on said shafts.

The cutter shafts are approximately cylindrical but are tapered slightly toward the end and are stepped down at the end to form a pilot pin 8 of small diameter thereon, integral with the shaft. In the outer periphery of the shaft adjacent the leg is an outboard roller bearing. The shaft may be slightly recessed to form a raceway as shown at 9 in Fig. 1, or the shaft may be left plain as shown at 9' in Fig. 2. Where the race is countersunk the roller fits closely therein and has no longitudinal play. But in the Fig. 2 embodiment the bearing may have a longitudinal sliding movement on the shaft.

There is also a ball bearing spaced further along toward the end of the shaft. This comprises a raceway 10 in the shaft and a raceway 11 in the cutter shell, in which a row of balls 12 may roll. These balls are inserted into the raceways through a longitudinal opening 13 in the shaft. This opening is filled later by a plug 14 held in place by a bond 16 of welding material. The end of the plug 14 adjacent the ball race is recessed to form part of the wall of said raceway.

The cutter 7 is shown as of a conventional form and it is to be understood that teeth 17 of any preferred form may be cut thereon. The interior of the approximately conical cutter shell is recessed to fit the shaft loosely so that the flushing fluid may enter about the bearings. A hole 18 at the apex of the cone may be provided to facilitate the fluid circulation. In the Fig. 1 embodiment the interior cutter face is cut away at 19 adjacent the end of the roller raceway so that there will be no contact with the end of the roller. This prevents the rubbing of the moving cutter against the ends of the rollers so that said rollers will not be moved out of position aligned parallel with the longitudinal axis of the shaft. Furthermore, there is no thrust of the cutter upon the roller bearings longitudinally, all the thrust being taken up by the balls 12. The lateral thrust is taken up by the rollers and by the pilot pin 8 and the rolling action of the cutter is balanced, so that uniform wear will take place, and the cutter bearing will stand up until the teeth on the outer surface are destroyed. The thrust longitudinally is not taken by the rollers in Fig. 2 for the reason that said rollers may move along the shaft.

What we claim as new is:

1. In a well drill, a head, a cutter shaft integral with said head and having an outboard roller raceway and a ball raceway spaced therefrom, an approximately conical cutter fitting about the end of said shaft and having raceways to register with the raceways in said shaft, rollers in said roller raceways and balls in said ball raceways; said balls being insertable through said shaft and head when said cutter is mounted thereon.

2. In a roller bit; a head having a cutter recess, the opposite walls of said recess extending downwardly and outwardly from the longitudinal axis of said head; bearings projecting downwardly and inwardly into said recess from said walls, each of said bearings having a roller raceway adjacent its wall of said recess, and a ball raceway between said roller raceway and the end of said bearing; roller cutters enclosing said bearings each of said cutters having a roller raceway and a ball raceway; rollers in said roller raceways; each of said bearings having a bore leading transversely into its ball raceway; balls insertable through said bores into said ball raceways; and plugs insertable into said bores to hold said balls in said ball raceways; said cutters being rotatably locked on said bearings by said balls; the longitudinal thrust on said cutters being taken by said balls and not by said rollers.

3. In a roller bit; a head having a cutter recess, the opposite walls of said recess extending downwardly and outwardly from the longitudinal axis of said head; bearings projecting downwardly and inwardly into said recess from said walls, each of said bearings having a roller raceway adjacent its wall of said recess, and a ball raceway between said roller raceway and the end of said bearing; roller cutters enclosing said bearings; each of said cutters having a roller raceway and a ball raceway; rollers in said roller raceways; each of said bearings having a bore leading transversely into its ball raceway; balls insertable through said bores into said ball raceways; and plugs insertable into said bores to hold said balls in said ball raceways; said cutters being rotatably locked on said bearings by said balls.

4. In a roller bit; a head having a cutter recess, the opposite walls of said recess extending downwardly and outwardly from the longitudinal axis of said head; bearings projecting downwardly and inwardly into said recess from said walls, each of said bearings having a roller raceway adjacent its wall of said recess and a ball raceway between said roller raceway and the end of said bearing; roller cutters enclosing said bearings; each of said cutters having a roller raceway and a ball raceway; rollers in said roller raceways; and balls in said ball raceways to rotatably lock said cutters on said bearings.

5. In a roller bit; a head having a cutter recess, the opposite walls of said recess extending downwardly and outwardly from the longitudinal axis of said head; bearings projecting downwardly and inwardly into said recess from said walls, each of said bearings having a roller raceway and a ball raceway; roller cutters enclosing said bearings; each of said cutters having a roller raceway and a ball raceway; rollers in said roller raceways; and balls in said ball raceways; said cutters being rotatably locked on said bearings by said balls; the longitudinal thrust on said cutters being taken by said balls and not by said rollers.

6. A roller bearing having a roller raceway and a ball raceway; a cutter on said bearing and having a roller raceway and a ball raceway; rollers in said roller raceways; and balls in said ball raceways; said balls serving to rotatably lock said cutters on said bearings.

7. A roller bearing having a roller raceway and a ball raceway; a cutter on said bearing and having a roller raceway and a ball raceway; rollers in said roller raceways; and balls in said ball raceways; said balls serving to rotatably lock said cutter on said bearing, the longitudinal thrust of said cutter being taken by said balls and not by said rollers.

8. A roller bit having a head; a bearing on and extending downwardly at an angle to the longitudinal axis of said head, said bearing having a roller raceway adjacent said head and a ball raceway between said roller raceway and the end of said bearing; a cutter enclosing said bearing and having a roller raceway and a ball raceway; rollers in said roller raceways; and balls in said ball raceways.

9. A roller bit having a head; a bearing on and extending downwardly at an angle to the longitudinal axis of said head, said bearing having a roller raceway adjacent said head and a ball raceway between said roller raceway and the end of said bearing; a cutter enclosing said bearing and having a roller raceway and a ball raceway; rollers in said roller raceways; and balls in said ball raceways; the longitudinal thrust of said cutters being taken by said balls and not by said rollers.

10. A roller bit having a head; a bearing on and extending downwardly at an angle to the longitudinal axis of said head, said bearing having a roller raceway adjacent said head and a ball raceway between said roller raceway and the end of said bearing; a cutter enclosing said bearing and having a roller raceway and a ball raceway; rollers in said roller raceways; balls in said ball raceways; said bearing having a bore leading transversely into its ball raceway; said balls being insertable into said ball raceways through said bore, and a plug insertable into said bore to hold said balls in said raceways to rotatably lock said cutter on said bearing.

11. A roller bit having a head; a bearing on and extending downwardly at an angle to the longitudinal axis of said head, said bearing having a roller raceway adjacent said head and a ball raceway between said roller raceway and the end of said bearing; a cutter enclosing said bearing and having a roller raceway and a ball raceway; rollers in said roller raceways; balls in said ball raceways; said bearing having a bore leading transversely into its ball raceway; said balls being insertable into said ball raceways through said bore, and a plug insertable into said bore to hold said balls in said raceways to rotatably lock said cutter on said bearing; the longitudinal thrust of said cutter being taken by said balls and not by said rollers.

12. A cup-shaped roller cutter, having an internal roller raceway adjacent its rim, and an internal ball raceway adjacent its bottom.

13. A roller cutter having a substantially cylindrical base portion, a substantially conical point portion, a ball raceway in that part of said base portion adjacent said point portion, and a roller raceway in that part of said base portion remote from said point portion.

14. A roller cutter bearing having an external roller raceway, and an external ball raceway between said roller raceway and the end of said bearing.

15. In a roller bit, a head having a cutter recess in the bottom thereof, and a pair of cutters in said recess, each of said cutters having a substantially cylindrical base portion and a substantially conical point portion, the said base portion being outermost, roller bearings adjacent the extremity of the base portion of said cutter, and ball bearings between said roller bearings and the point of said cutter, said ball bearings serving to rotatably lock said cutter on said head.

LEWIS E. GARFIELD.
FLOYD L. SCOTT.